(12) United States Patent
Mikutsu et al.

(10) Patent No.: US 9,110,360 B2
(45) Date of Patent: Aug. 18, 2015

(54) IMAGE PROJECTION APPARATUS

(71) Applicants: Yasunari Mikutsu, Tokyo (JP); Hideo Namba, Kanagawa (JP); Satoshi Tsuchiya, Kanagawa (JP); Naoyuki Ishikawa, Kanagawa (JP); Hideo Kanai, Tokyo (JP); Motohisa Ikeda, Tokyo (JP); Masamichi Yamada, Kanagawa (JP)

(72) Inventors: Yasunari Mikutsu, Tokyo (JP); Hideo Namba, Kanagawa (JP); Satoshi Tsuchiya, Kanagawa (JP); Naoyuki Ishikawa, Kanagawa (JP); Hideo Kanai, Tokyo (JP); Motohisa Ikeda, Tokyo (JP); Masamichi Yamada, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 114 days.

(21) Appl. No.: 13/964,239

(22) Filed: Aug. 12, 2013

(65) Prior Publication Data

US 2014/0071410 A1    Mar. 13, 2014

(30) Foreign Application Priority Data

Sep. 10, 2012 (JP) ................................ 2012-198882

(51) Int. Cl.
*G03B 21/14* (2006.01)
*G03B 21/20* (2006.01)
*G03B 21/18* (2006.01)

(52) U.S. Cl.
CPC .............. *G03B 21/20* (2013.01); *G03B 21/145* (2013.01); *G03B 21/2086* (2013.01); *G03B 21/18* (2013.01)

(58) Field of Classification Search
CPC ............. G03B 21/145; G03B 21/2093; G03B 21/2006
See application file for complete search history.

(56) References Cited

U.S. PATENT DOCUMENTS

2003/0081185 A1* 5/2003 Nakano et al. ................. 353/97
2013/0114054 A1   5/2013 Ishikawa et al.

FOREIGN PATENT DOCUMENTS

| CN | 1387083 A | 12/2002 |
| CN | 101446750 A | 6/2009 |
| JP | 2004-325643 A | 11/2004 |
| JP | 2012-093546 | 5/2012 |

OTHER PUBLICATIONS

Chinese Office Action issued in Application No. 201310393725.7 on Apr. 28, 2015 (w/ English Translation).

* cited by examiner

*Primary Examiner* — Sultan Chowdhury
*Assistant Examiner* — Danell L Owens
(74) *Attorney, Agent, or Firm* — Oblon, McClelland, Maier & Neustadt, L.L.P.

(57) ABSTRACT

An image projection apparatus includes a housing unit; a light source unit provided on the housing unit; an outer cover mounted on the housing unit; a second cover provided nearer to the light source unit than the outer cover; a first mounting member formed on the housing unit; a second mounting member formed on the outer cover and fixing the outer cover to the housing unit when mounted on the first mounting member; a displacement member movable to both a position where mounting of the second mounting member to the first mounting member is inhibited and a position where mounting of the second mounting member to the first mounting member is permitted; and a displacement control member that moves the displacement member to the position where the mounting of the second mounting member to the first mounting member is permitted when the second cover is correctly mounted.

2 Claims, 8 Drawing Sheets

(a)

(b)

(a)

(b)

(c)

IMAGE PROJECTION APPARATUS

CROSS-REFERENCE TO RELATED APPLICATIONS

The present application claims priority to and incorporates by reference the entire contents of Japanese Patent Application No. 2012-198882 filed in Japan on Sep. 10, 2012.

BACKGROUND OF THE INVENTION

1. Field of the Invention

The present invention relates to an image projection apparatus.

2. Description of the Related Art

Image projection apparatuses have been known that generate an image for projecting using light output from a light source based on image data from an apparatus such as a personal computer or a video camera, and project the generated image for display onto a surface such as a screen on which the image is projected. In such image projection apparatuses, it is desired that images can be projected large-sized, and that the distance between the image projection apparatus and the surface on which the image is projected can be set as short as possible. Image projection apparatuses have been disclosed in the related art that adopt a short projection distance.

In such an image projection apparatus, various functions are mounted for ensuring safety. For example, a fireproof cover is provided on an image projection apparatus for the purpose of preventing spread of possible fire from the light source. More specifically, in an image projection apparatus described in Japanese Patent Application Laid-open No. 2012-93546, a user has to remove a cover when installing a light source device therein. If the cover is not mounted correctly, a mechanism provided in the apparatus inhibits drive of the light source device. If fire occurs from the light source device, spread of the fire to the outside of a housing of the apparatus due to absence of the cover can be prevented with the structure of the apparatus.

Recently, an increasing number of end users have come to be able to replace the light source of the image projection apparatus by themselves; therefore, there is a need of structuring the cover of the image projection apparatus so that the end users can readily remove the cover from the apparatus when replacing the light source. If a fireproof function is provided on the cover as described above, however, the cover is essentially locked by a screw for being hardly removed. This may impair ready replaceability of the light source.

In view of the circumstances as described above, there is needed to provide an image projection apparatus in which a light source is readily replaceable and possible fire from the light source can be prevented from spreading.

SUMMARY OF THE INVENTION

It is an object of the present invention to at least partially solve the problems in the conventional technology.

According to the present invention, there is provided: an image projection apparatus includes a housing unit; a light source unit removably provided on the housing unit; an outer cover included in the exterior of the housing unit when mounted on the housing unit; a second cover provided at a position nearer to the light source unit than the outer cover; a first mounting member formed on the housing unit; a second mounting member formed on the outer cover and fixing the outer cover to the housing unit when mounted to the first mounting member; a displacement member movable to both a position where mounting of the second mounting member to the first mounting member is inhibited and a position where mounting of the second mounting member to the first mounting member is permitted; and a displacement control member that moves the displacement member to the position where the mounting of the second mounting member to the first mounting member is permitted when the second cover is correctly mounted.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
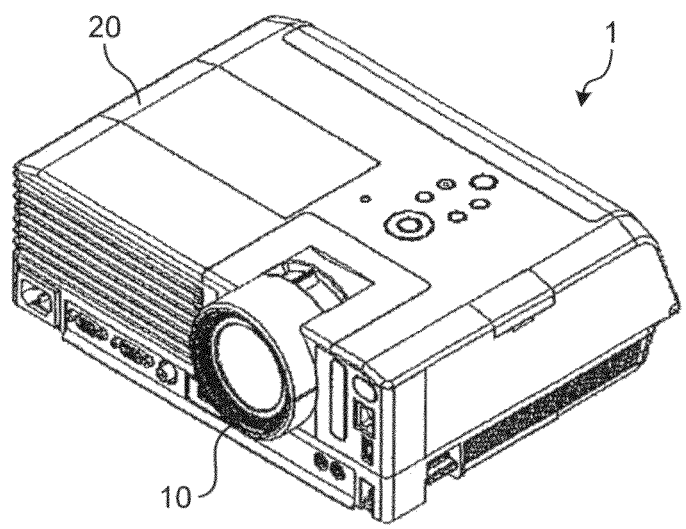
FIG. 1 is a perspective view of a projector according to an embodiment of the present invention.
Figure 2:
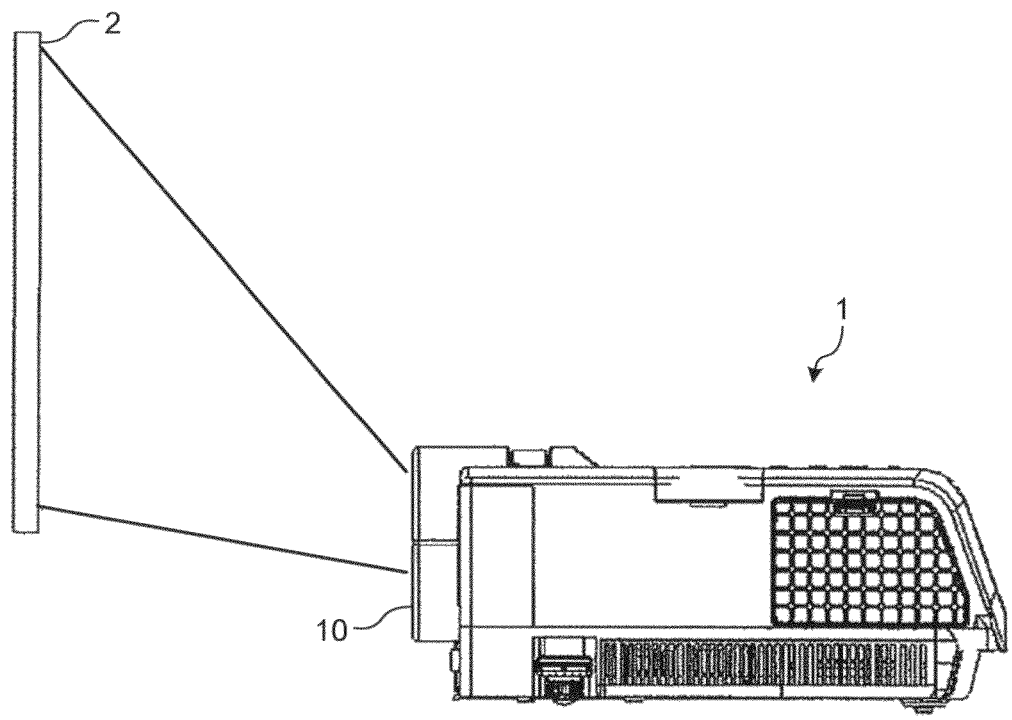
FIG. 2 is a side view of the projector according to the embodiment.

The description hereinafter explains an embodiment of a projector as an image projection apparatus to which the present invention is applicable. FIG. 1 is a perspective view of a projector 1 and FIG. 2 is a side view of a projector 1. FIG. 2 illustrates a state in which a screen 2 serving as a surface on which the image is projected is irradiated with a projected light emitted from a projector lens 10.

Figure 3:
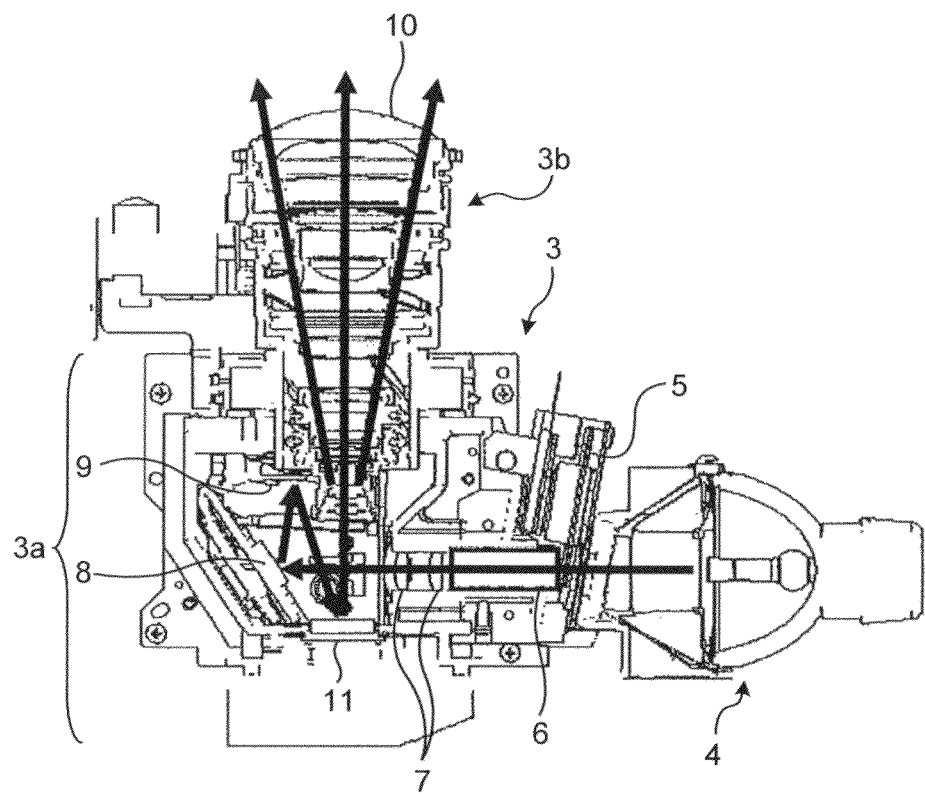
FIG. 3 is an internal cross-sectional view of an optical device and a light source device according to the embodiment.
Figure 4:
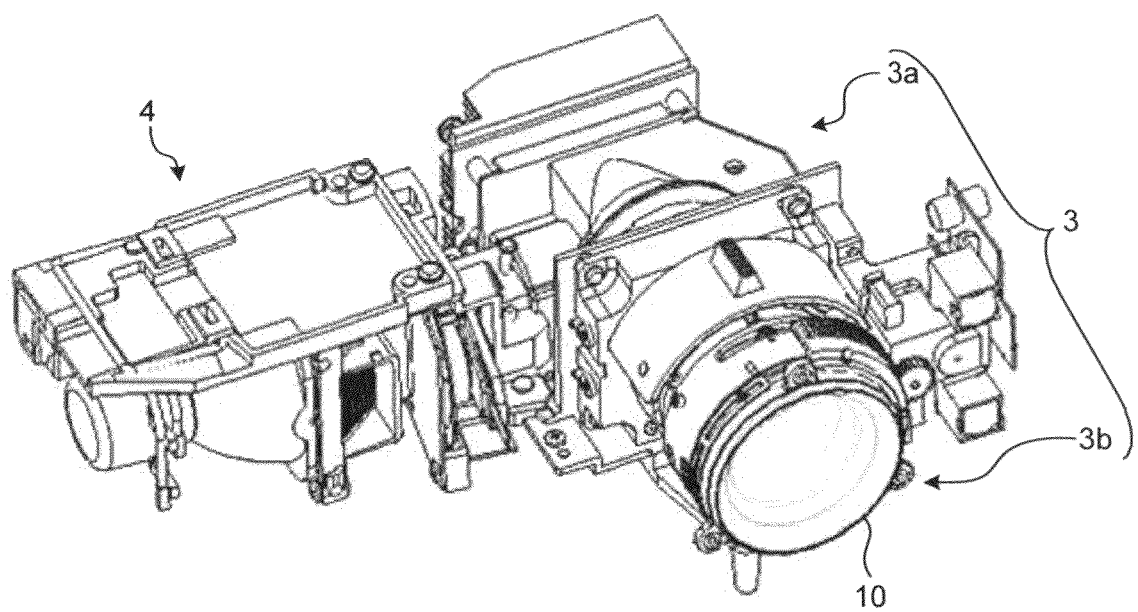
FIG. 4 is a perspective view of the optical device and the light source device according to the embodiment.

FIG. 3 is a cross-sectional view of an optical device 3 and a light source device 4. FIG. 4 is a perspective view of the optical device 3 and the light source device included in the projector 1.

As illustrated in FIGS. 3 and 4, the optical device 3 includes an illumination mechanism 3a and a projecting mechanism 3b. The optical device 3 includes a color wheel 5, a light tunnel 6, a relay lens 7, a plane mirror 8, and a concave mirror 9. In the optical device 3, an image forming unit 11 including digital micromirror devices (DMD) is provided.

The color wheel 5 in a disk shape converts white light emitted from the light source device 4 into lights of red, green, and blue repeatedly in a certain time unit and outputs the light to the light tunnel 6. The light tunnel 6 has a tubular structure made of a plurality of glass plates glued or pasted to each other, and outputs the light emitted from the color wheel 5 to the relay lens 7. The relay lens 7 includes two lenses combined with each other, and concentrates the light output from the light tunnel 6 while correcting the axial chromatic aberration of the light. The plane mirror 8 and the concave mirror 9 reflect the light output from the relay lens 7 and guide the light to the image forming unit 11, thereby concentrating the light. The image forming unit 11 includes digital micromirror devices (DMD) having a rectangular mirror-surface formed with a plurality of micromirrors driven in a time-division manner based on data of a moving image or a still image. The DMD process and reflect the projected light so that predetermined image data is formed.

The light source device 4 includes a high pressure mercury lamp as a light source. The light source device 4 irradiates the illumination mechanism 3a of the optical device 3 with white light. In the illumination mechanism 3a, the white light emitted from the light source device 4 is divided into red, green, and blue lights (RGB) and guided to the image forming unit 11. The image forming unit 11 forms images according to a modulation signal, and the projecting mechanism 3b magnifies the formed image and projects the magnified image.

An OFF light plate is provided in an upper portion in the vertical direction of the image forming unit 11, that is, on the near side in FIG. 3. The OFF light plate receives unwanted light not used as a projected light. When light enters the image forming unit 11, a plurality of micromirrors are activated by operations of the DMD in a time-division manner based on moving image data. The micromirrors reflect the light in use to the projector lens 10 and the light discarded to the OFF light plate. In the image forming unit 11, the light used for a projected image is reflected to the projecting mechanism 3b, magnified through the projector lenses 10, whereby the magnified image light is projected.

Figure 5:
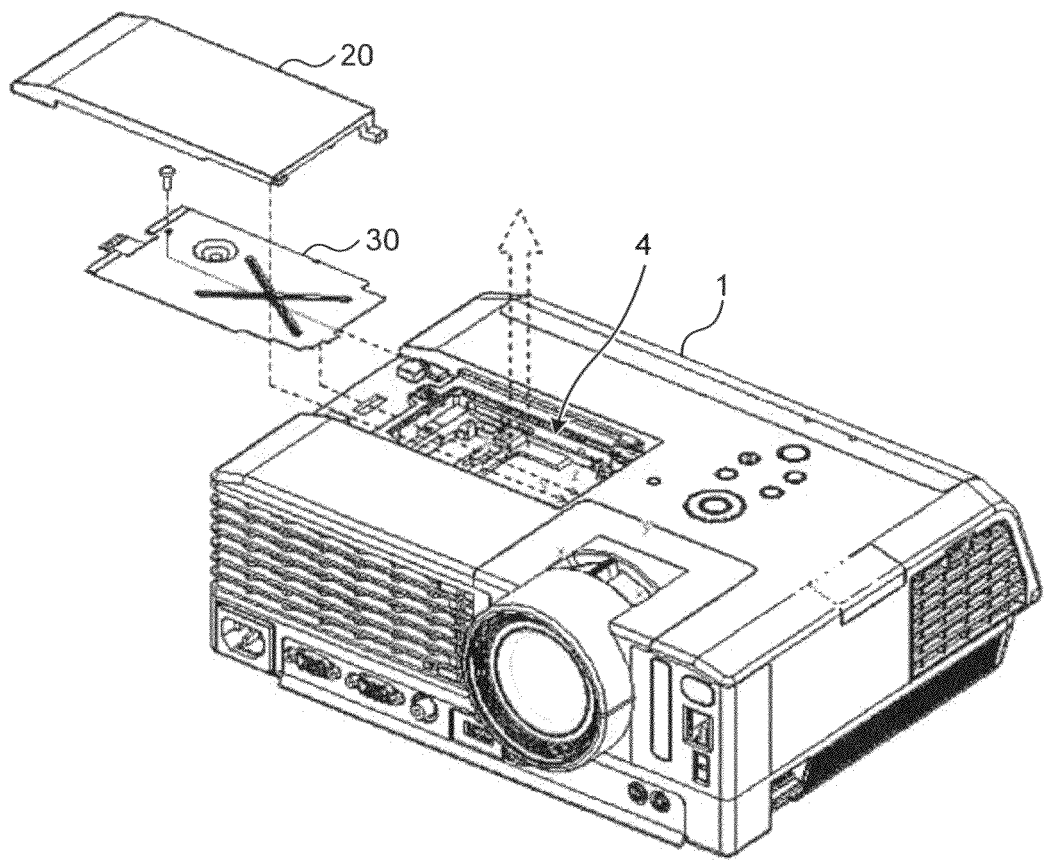
FIG. 5 is a perspective view of the projector according to the embodiment in a state in which covers are, removed.

FIG. 5 is a perspective view of the projector 1 according to the embodiment in a state in which an outer cover 20 and a fireproof cover 30 are removed therefrom. As illustrated in FIG. 5, the outer cover 20 and the fireproof cover 30 (a second cover) are removably provided in the projector 1. The outer cover 20 and the fireproof cover 30 are provided at the positions where they cover the upper area of the light source device 4. By removing the outer cover 20 and the fireproof cover 30, users can remove the light source device 4 provided in the projector 1 or install another light source device 4 into the projector 1. The outer cover 20 is flush with a housing 40 (a housing unit) forming the exterior of the projector 1. The fireproof cover 30 is a member made of a flame-retardant resin or metal.

Figure 6:
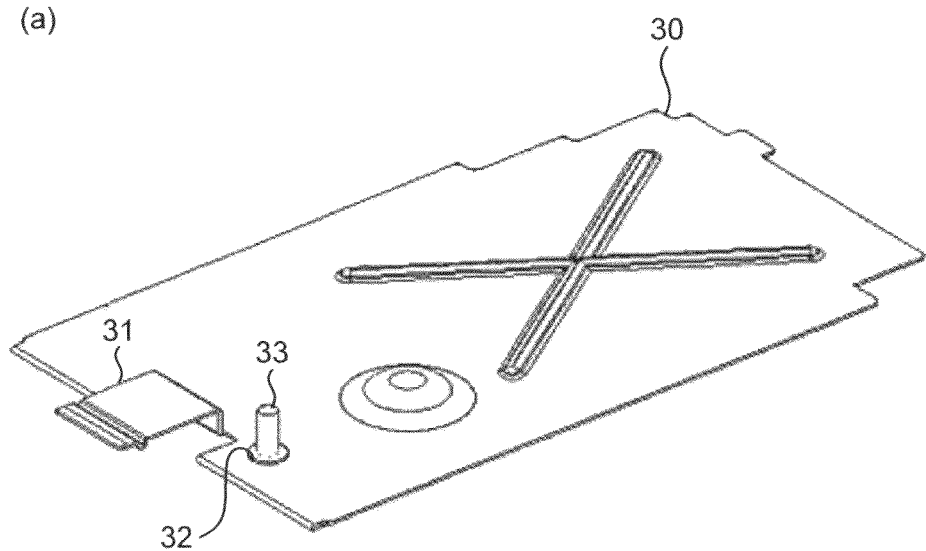
FIGS. 6(a) and 6(b) are perspective views of a fireproof cover according to the embodiment.
Figure 6:
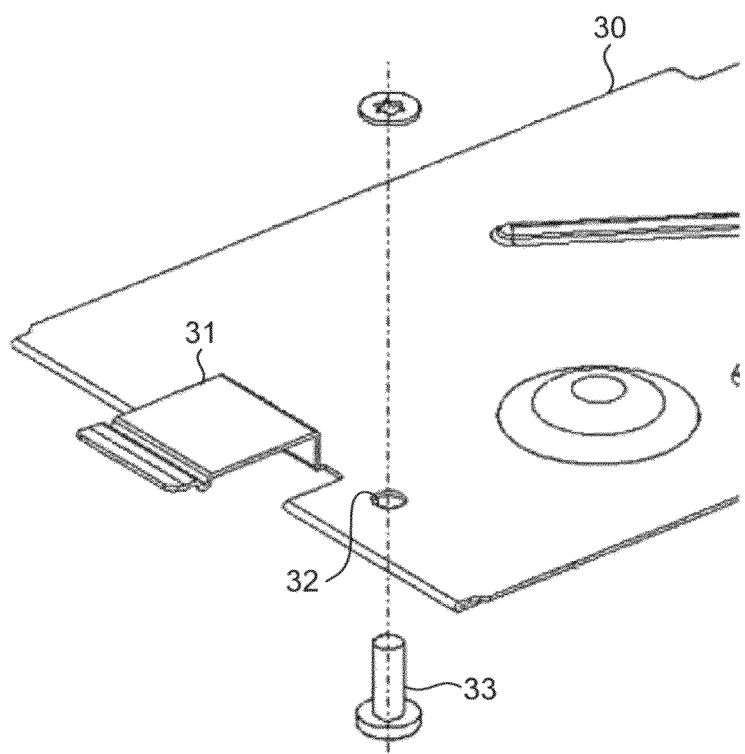

FIGS. 6(a) and (b) are diagrams illustrating the structure of the rear surface of the fireproof cover 30. As illustrated in FIG. 6, a latch 31 and a fixing hole 32 are provided on the fireproof cover 30. The latch 31 is inserted into a hole formed in the housing 40 of the projector 1 and locked therein. A screw 33 is inserted into the fixing hole 32 and locked therein, whereby the fireproof cover 30 is fixed to the projector 1.

Figure 7:
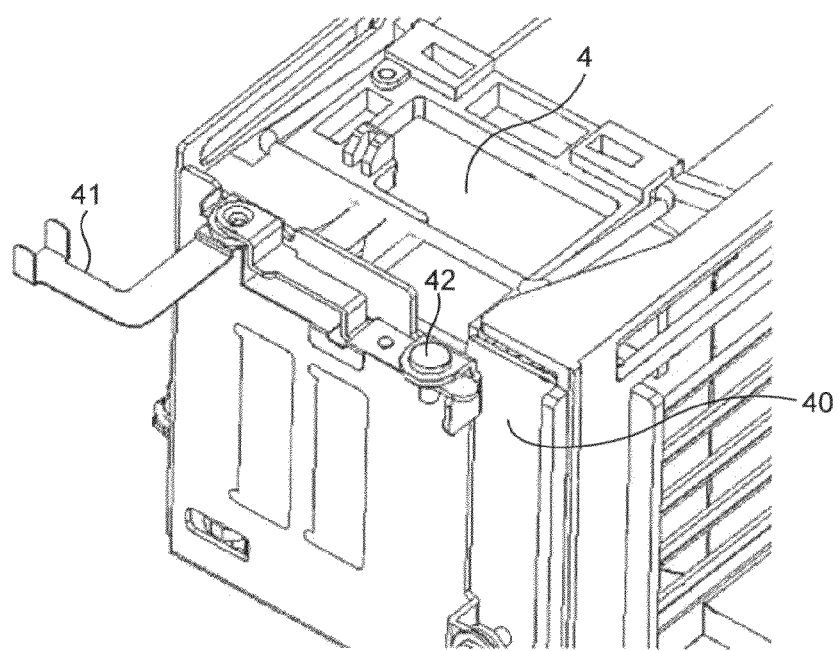
FIG. 7(a) is a perspective view illustrating the installation structure of the fireproof cover according to the embodiment.
FIGS. 7(b) and 7(c) are side cross-sectional views of a main section of the installation structure of the fireproof cover.
Figure 7:
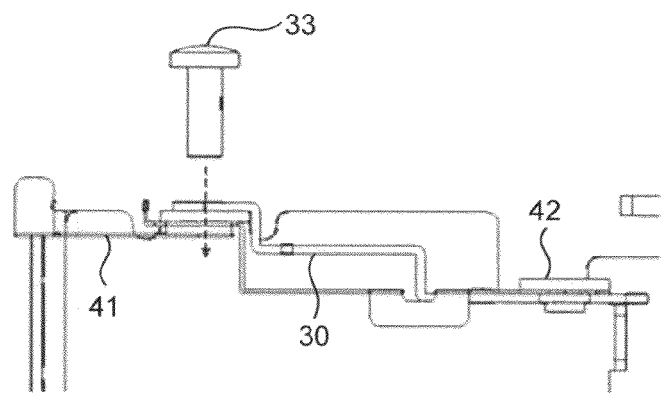
Figure 7:
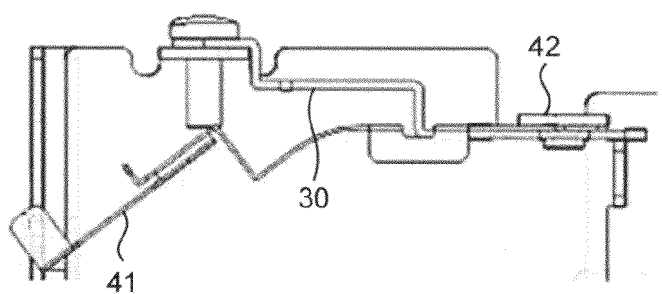

FIGS. 7(a) to (c) are diagrams illustrating the structure of the housing 40 of the projector 1 on which the fireproof cover 30 is mounted. As illustrated in FIG. 7(a), an elastic plate 41 is provided on the housing 40. The elastic plate 41 is fixed to the housing 40 at one of its ends by a fixing member 42. The elastic plate 41 is structured so that its not-fixed end elastically deforms in the up and down direction, thereby changing its position. As illustrated in FIGS. 7(b) and (c), when the above-described fireproof cover 30 is mounted and fixed by the screw 33, the end of the screw 33 presses the elastic plate 41 downward, thereby moving the not-fixed end of the elastic plate 41 downward.

Figure 8:
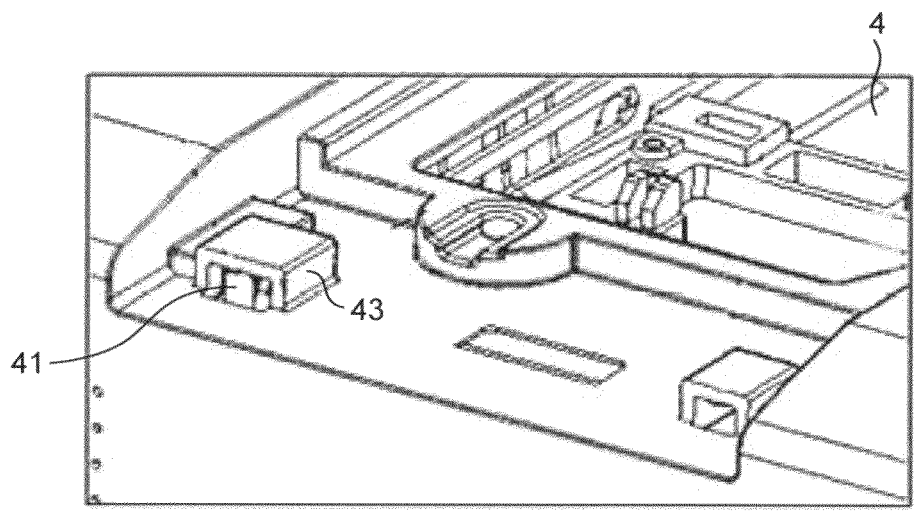
FIG. 8 is a perspective view illustrating the installation structure of an outer cover according to the embodiment in a state in which the outer cover cannot be mounted.
Figure 9:
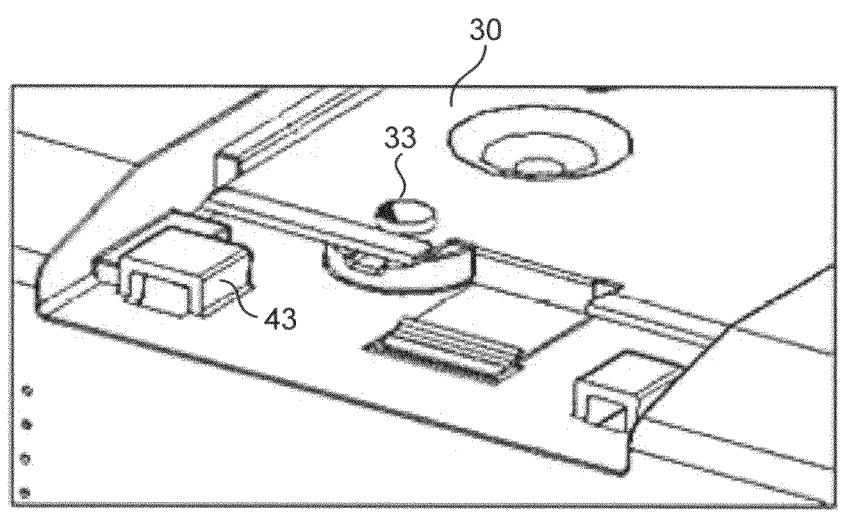
FIG. 9 is a perspective view illustrating the installation structure of the outer cover according to the embodiment in a state in which the outer cover can be mounted.

FIG. 8 and FIG. 9 are diagrams illustrating the installation structure of the outer cover 20 for explaining displacement of the elastic plate 41. FIG. 8 illustrates a state in which the fireproof cover 30 is not mounted on the housing 40, and FIG. 9 illustrates a state in which the fireproof cover 30 is mounted on the housing 40. When the fireproof cover 30 is not mounted on the housing 40 as illustrated in FIG. 8, the end of the elastic plate 41 exists at the position where it covers an insertion recessed portion 43 formed on the housing 40. In this state, the outer cover 20 cannot be mounted on the housing 40 inhibited by the elastic plate 41, whereby the outer cover 20 is not permissible for being mounted on the housing 40.

By contrast, when the fireproof cover 30 is mounted on the housing 40 as illustrated in FIG. 9, the elastic plate 41 is displaced by the screw 33. The elastic plate 41 therefore exists at a position so as not to inhibit the insertion of the outer cover 20 into the insertion recessed portion 43. The mounting of the outer cover 20 on the housing 40 is therefore permissible in this state. In the embodiment of the present invention, the elastic plate 41 corresponds to a displacement member, the screw 33 corresponds to a displacement control member, the insertion recessed portion 43 corresponds to a first mounting member, and the following insertion protrusion 46 corresponds to a second mounting member.

Figure 10:
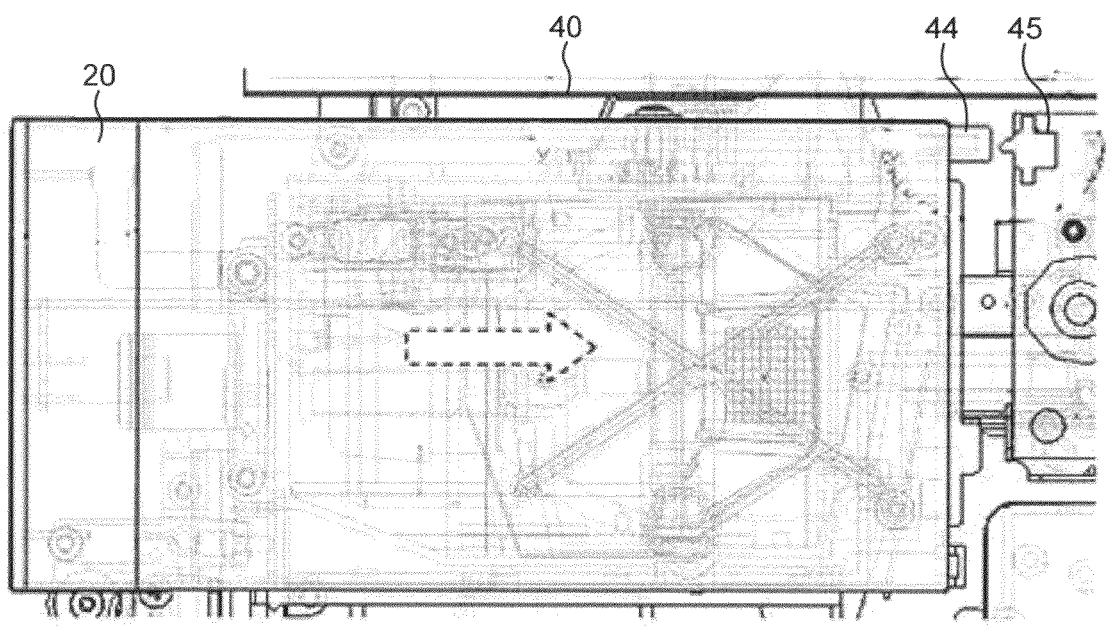
FIG. 10 is a diagram for explaining the installation structure of the outer cover according to the embodiment in a state in which the outer cover is to be mounted to the housing.
Figure 11:
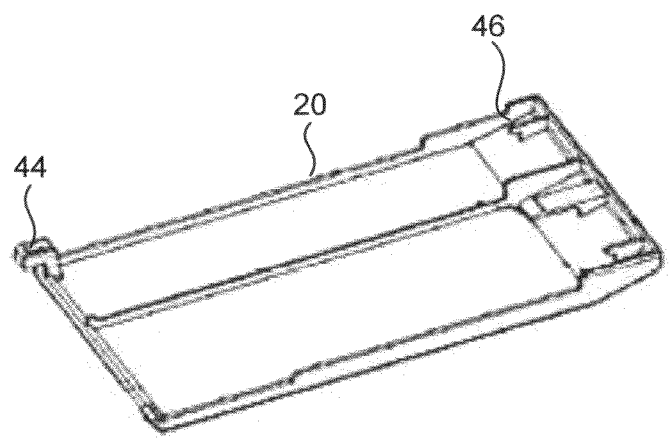
FIG. 11 is a perspective view of the rear surface of the outer cover according to the embodiment.
Figure 12:
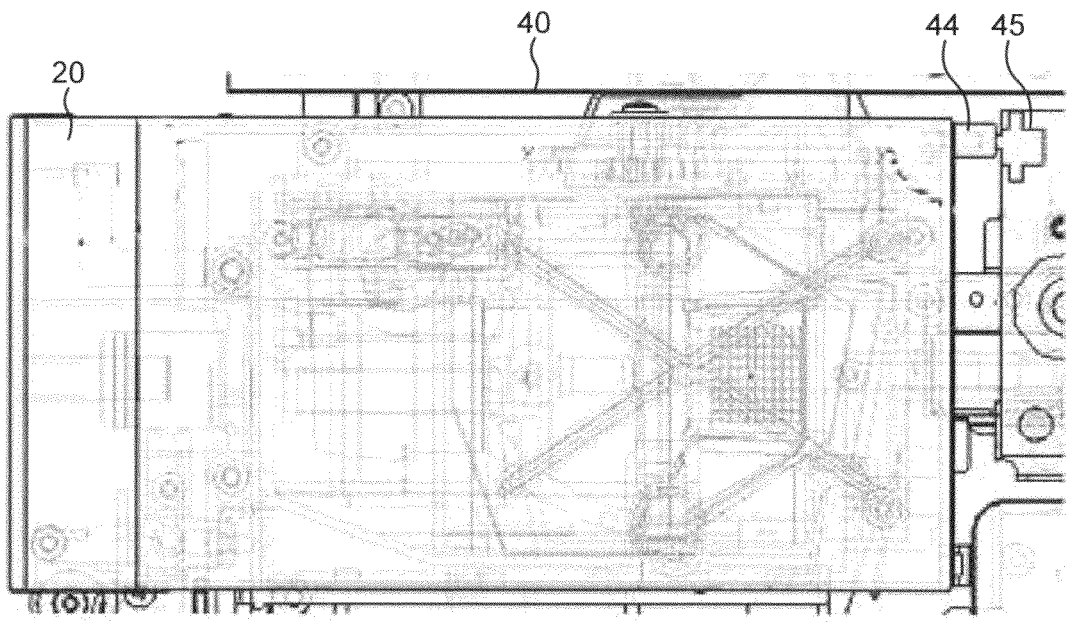
FIG. 12 is a view for explaining the installation structure of the outer cover according to the embodiment in a state in which the outer cover is completely mounted to the housing.

The installation mode of the outer cover 20 will now be described with reference to FIGS. 10 to 12. FIG. 10 illustrates a state in which the outer cover 20 is not completely mounted on the housing 40. In this state, the protruding portion 44 formed on the outer cover 20 does not contact with a mounting detection unit 45, whereby the mounting detection unit 45 does not detect that the outer cover 20 is appropriately mounted on the housing 40. With the structure of the projector 1 according to the embodiment, in a state in which the outer cover 20 is not mounted thereon, the light source device 4 is not driven. FIG. 11 illustrates the shape of the rear surface of the outer cover 20. The protruding portion 44 and the insertion protrusion 46 are provided on the outer cover 20. The insertion protrusion 46 is inserted into the insertion recessed portion 43 formed on the above-described housing 40.

When the fireproof cover 30 is mounted on the above-described housing 40 as described above, the insertion protrusion 46 can be inserted into the insertion recessed portion 43. The outer cover 20 in the state illustrated in FIG. 10 is further slid for being completely mounted on the housing 40. When the outer cover is completely mounted on the housing 40 as illustrated in FIG. 12, the protruding portion 44 comes in contact with the mounting detection unit 45, then the mounting of the outer cover 20 is detected, thereby enabling the drive of the light source device 4. A drive control unit is provided in the projector according to the embodiment that controls the drive of the light source device 4. The drive control unit is implemented with a central processing unit (CPU) and a computer program for drive control stored in a memory, for example. The drive control unit determines whether or not the light source device 4 is driven based on a signal from the mounting detection unit 45.

In the projector 1 according to the embodiment as described above, when the fireproof cover 30 is not mounted, the outer cover 20 cannot be mounted. This prevents a user from forgetting to mount the fireproof cover 30, whereby possible fire from the light source device 4 can be prevented from spreading. By separating the outer cover 20 from the fireproof cover 30 that needs fixing for fireproofing, the outer cover 20 does not need fixing by the screw. This prevents impairment of the design of the projector.

In addition, the fireproof cover 30 and the outer cover 20 are both readily removable, the light source device 4 therefore can be readily replaced.

With the structure of the projector 1 according to the embodiment, by deforming the elastic plate 41 by mounting the fireproof cover 30, the elastic plate 41 is movable between the position where the outer cover 20 can be mounted and the position where the outer cover 20 cannot be mounted. This achieves the projector with a simple structure because permission of the mounting of the outer cover 20 can be controlled simply by deformation of the member.

Furthermore, when the outer cover 20 is not mounted correctly on the projector 1, the light source device 4 cannot be driven, whereby possible fire from the light source device 4 can be further prevented from spreading.

The mounting detection unit 45 is not necessarily provided. In addition, the mounting of the outer cover 20 on the projector 1 can be inhibited with another structure. For example, when the fireproof cover is mounted, the fireproof cover is electrically driven to move to a position where mounting the fireproof cover is not permissible. The recessed portion formed on the housing may be formed on the cover, and the protruding portion formed on the cover may be formed on the housing, instead.

The present invention can provide the advantageous effects of readily replacing a light source and preventing possible fire from the light source from spreading.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising:
   a housing unit;
   a light source unit configured to be removably provided on the housing unit;
   an outer cover configured to be included in the exterior of the housing unit when mounted on the housing unit;
   a second cover configured to be provided at a position nearer to the light source unit than the outer cover;
   a first mounting member configured to be formed on the housing unit;
   a second mounting member configured to be formed on the outer cover and to fix the outer cover to the housing unit when mounted to the first mounting member;
   a displacement member configured to be movable to both a position where mounting of the second mounting member to the first mounting member is inhibited and a position where mounting of the second mounting member to the first mounting member is permitted; and
   a displacement control member configured to move the displacement member to the position where the mounting of the second mounting member to the first mounting member is permitted when the second cover is correctly mounted.

2. The image projection apparatus according to clam 1, further comprising:
   a mounting detection unit configured to detect that the outer cover is correctly mounted, and
   a drive control unit configured to permit drive of the light source unit when it is detected that the outer cover is correctly mounted.

\* \* \* \* \*